(12) United States Patent
Buchon et al.

(10) Patent No.: US 7,924,503 B2
(45) Date of Patent: Apr. 12, 2011

(54) BINOCULAR DISPLAY FOR DISPLAYING INFORMATION

(75) Inventors: Cédric Buchon, Charenton-le-Pont (FR); Yohann Felten, Charenton-le-Pont (FR)

(73) Assignee: Essilor Int'l (Compagnie Generale d'Optique) (FR)

( * ) Notice: Subject to any disclaimer, the term of this patent is extended or adjusted under 35 U.S.C. 154(b) by 134 days.

(21) Appl. No.: 11/991,884

(22) PCT Filed: Sep. 19, 2006

(86) PCT No.: PCT/FR2006/050905
§ 371 (c)(1),
(2), (4) Date: Mar. 10, 2008

(87) PCT Pub. No.: WO2007/039691
PCT Pub. Date: Apr. 12, 2007

(65) Prior Publication Data
US 2009/0268287 A1    Oct. 29, 2009

(30) Foreign Application Priority Data
Oct. 6, 2005  (FR) .................................... 05 53033

(51) Int. Cl.
*G02B 23/00* (2006.01)
(52) U.S. Cl. ............... 359/412; 359/630; 345/8
(58) Field of Classification Search .................. 359/412; 349/11
See application file for complete search history.

(56) References Cited

U.S. PATENT DOCUMENTS

| 2,715,852 | A | * | 8/1955 | Ellis ............................... 351/201 |
| 4,519,674 | A |   | 5/1985 | Buckley et al. ............... 359/514 |
| 5,106,179 | A | * | 4/1992 | Kamaya et al. ............... 351/158 |
| 5,543,816 | A | * | 8/1996 | Heacock ......................... 345/8 |
| 5,694,257 | A |   | 12/1997 | Arnone et al. ................ 359/822 |
| 5,767,820 | A | * | 6/1998 | Bassett et al. .................... 345/8 |
| 5,825,340 | A | * | 10/1998 | Torizuka et al. ................. 345/8 |
| 5,880,773 | A | * | 3/1999 | Suzuki .......................... 348/115 |
| 6,084,555 | A | * | 7/2000 | Mizoguchi et al. ............... 345/8 |
| 6,480,174 | B1 | * | 11/2002 | Kaufmann et al. ............... 345/8 |
| 6,683,584 | B2 | * | 1/2004 | Ronzani et al. .................. 345/8 |
| 2005/0078378 | A1 |   | 4/2005 | Geist ............................. 359/630 |
| 2005/0174651 | A1 |   | 8/2005 | Spitzer et al. ................. 359/630 |

FOREIGN PATENT DOCUMENTS

EP   1562066 A2 *  8/2005
WO   2004097462    11/2004

* cited by examiner

*Primary Examiner* — Lee Fineman
(74) *Attorney, Agent, or Firm* — Sofer & Haroun, LLP

(57) ABSTRACT

The invention relates to a binocular device for displaying information, the device comprising a support for placing on the nose and supporting a right display element and a left display element each designed to be placed in front of an eye and each comprising a light guide for receiving a beam of light rays emitted by a beam generator device towards an inlet face and for propagating the beam to an outlet face where the beam is directed towards the corresponding eye, the binocular device having an arrangement for adjusting the pupillary distance by moving at least one of the light guides relative to said support so as to adjust the distance between the light guides. According to the invention, said light guides are disposed over a said support and are held by a strip disposed over the light guides and secured to said support by means of at least one spacer, at least one slack takeup means being interposed between said strip and said light guides.

5 Claims, 4 Drawing Sheets

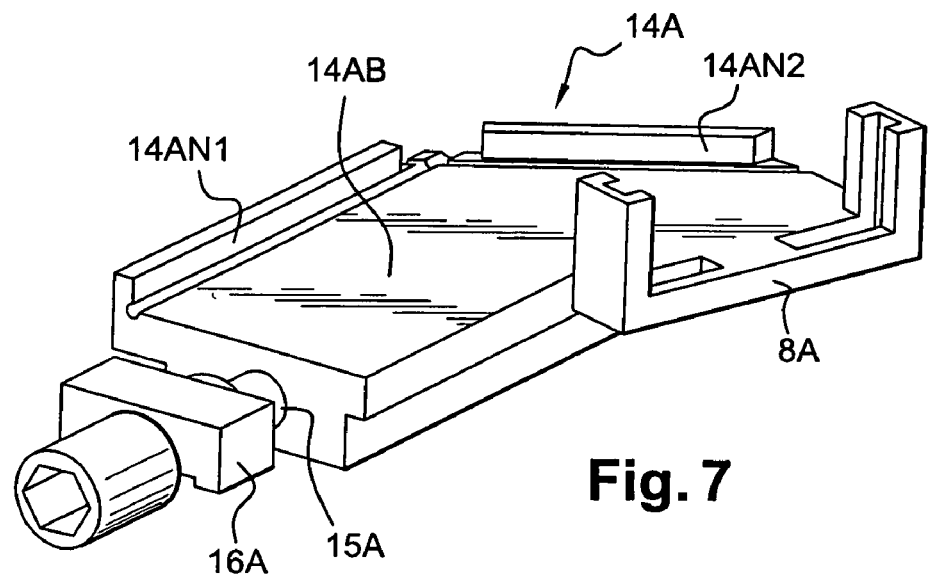
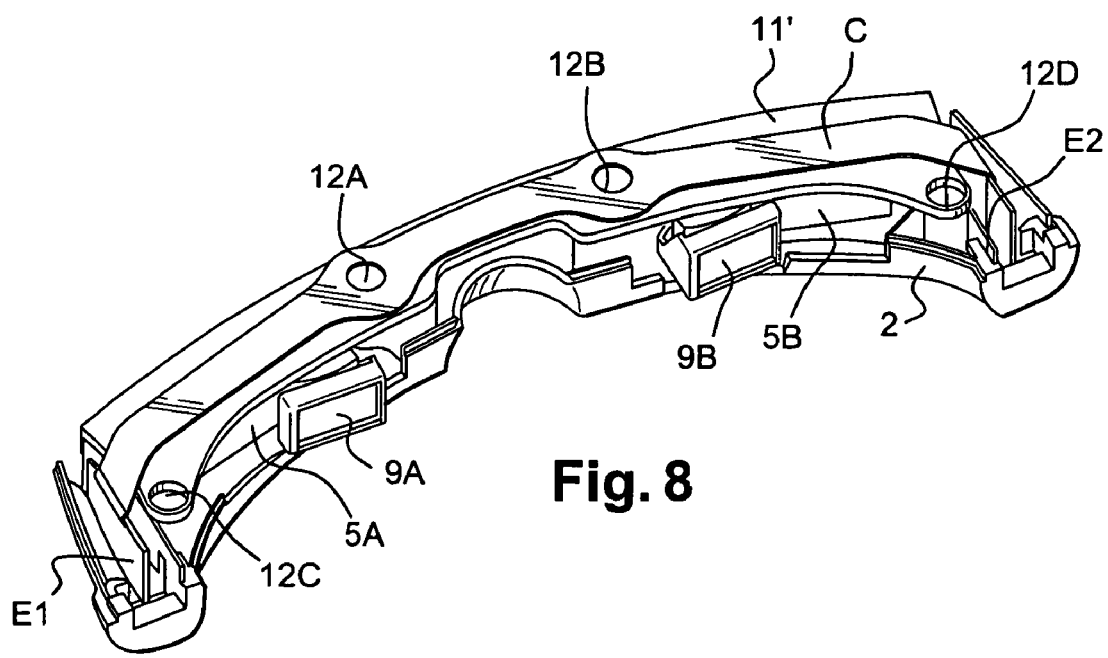

BINOCULAR DISPLAY FOR DISPLAYING INFORMATION

FIELD OF THE INVENTION:

The invention relates to a binocular device for displaying information of the image or multimedia type.

BACKGROUND OF THE INVENTION

The invention relates more particularly to a binocular information-display device comprising a support for placing on the nose and supporting a right display element and a left display element, each designed to be placed in front of an eye and each comprising a light guide for receiving a beam of light rays emitted by a beam generator device towards an inlet face and for propagating the beam to an outlet face where the beam is directed towards the corresponding eye.

One such device is described in patent document WO 2004/097462.

The device described in that document comprises a support for placing on the nose and on which there are suspended a right display element and a left display element. The device also comprises an arrangement for adjusting the pupillary distance by imparting relative displacement between the light guides and the support in order to adjust the distance between the light guides. In a variant embodiment, that adjustment arrangement can consist in a rail and slideway arrangement from which the light guides are suspended.

That type of display device poses the following technical problem.

It is difficult to make in practice since, given the tolerances of its component parts, it does not enable slack to be taken up. However, for comfortable vision of right and left images produced by the display, it is very important for the two images to be at the same height. This condition cannot be satisfied by the display described in that prior art document.

The invention solves this problem by proposing a binocular display device that is of construction that is reliable, simple, and economically advantageous.

OBJECTS AND SUMMARY OF THE INVENTION

To do this, the invention provides a binocular device for displaying information, the device comprising a support for placing on the nose and supporting a right display element and a left display element, each designed to be placed in front of an eye and each comprising a light guide for receiving a beam of light rays emitted by a beam generator device towards an inlet face and for propagating the beam to an outlet face where the beam is directed towards the corresponding eye, the binocular device having an arrangement for adjusting the pupillary distance by moving at least one of the light guides relative to said support so as to adjust the distance between the light guides, wherein said light guides are disposed over a said support and are held by a strip disposed over the light guides and secured to said support by means of at least one spacer, at least one slack takeup means being interposed between said strip and said light guides.

In a preferred embodiment, said slack takeup means are constituted by a compliance element interposed between said strip and each light guide.

Preferably, the device of the invention includes a cover part connected to said support and enclosing the light guides and said strip.

Advantageously, the binocular device includes, facing said outlet faces of said light guides, respective devices for supporting eyesight-correcting lenses.

Said arrangement for adjusting the pupillary distance may be constituted by a rail and slideway arrangement carried respectively by said support and by said respective light guide.

Said slideway is preferably constituted by a plate of T-shaped cross-section and secured to said light guide.

And said rail is advantageously shaped in said support.

Said adjustment arrangement may present a device that can be actuated from the outside, manually or under motor drive.

And, said actuatable device may comprise a screw-and-nut device connected to said plate and capable of being actuated through a lateral orifice arranged in said support.

BRIEF DESCRIPTION OF THE DRAWINGS

The invention is described below in greater detail with the help of figures that merely show a preferred embodiment of the invention.

FIG. 7 is a perspective view of a particular part of a binocular display device in accordance with the invention.

FIG. 8 is a fragmentary perspective view of a binocular display device in accordance with the invention, shown fitted with electronics and seen from behind.

MORE DETAILED DESCRIPTION

Figure 1:
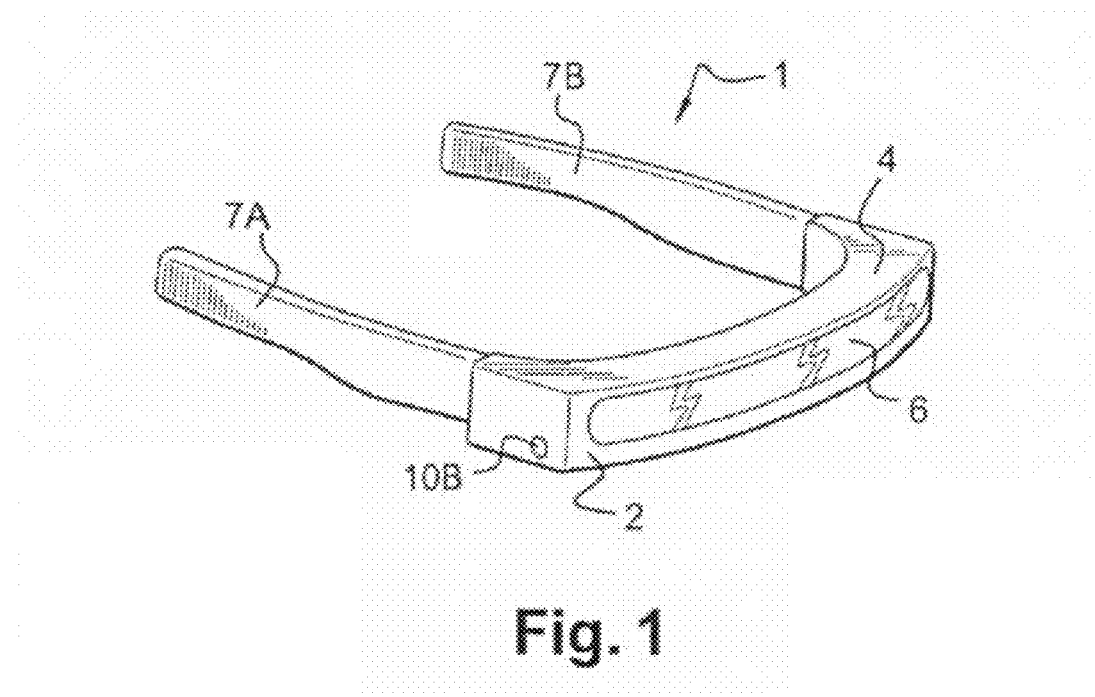
FIG. 1 is a perspective view of a binocular display device in accordance with the invention, seen from in front.
Figure 2:
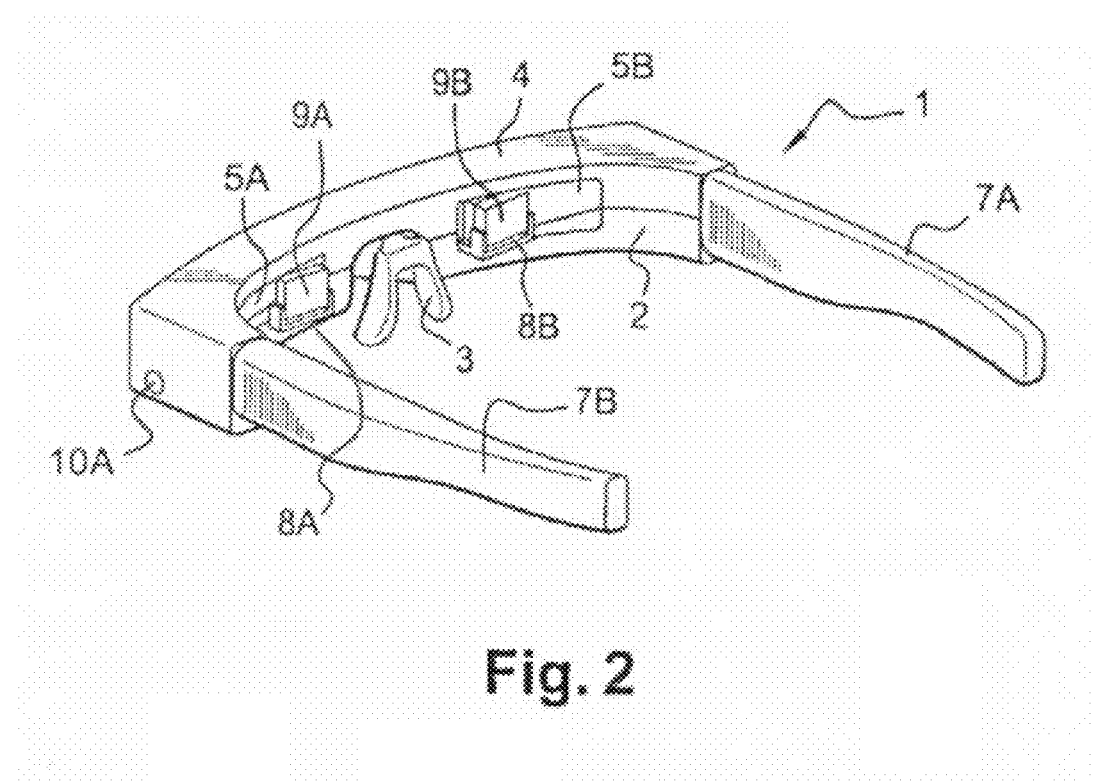
FIG. 2 is a perspective view of a binocular display device in accordance with the invention, seen from behind.

As shown in FIGS. 1 and 2, a binocular device 1 for displaying information comprises a support 2 for placing on the nose by means of a pince-nez type element 3 that is secured thereto. It also has a cover part 4 connected to the support 2 and containing light guides 5A, 5B and other component parts that are described in greater detail below.

The front face of the binocular device, which can be seen more particularly in FIG. 1, presents a transparent plate 6 held between the support 2 and the cover part 4. Two branches 7A, 7B of the eyeglass type serve to hold the binocular device on the ears of the wearer.

On the rear face of the device, as can be seen more particularly in FIG. 2, there are arranged two windows having the light guides 5A, 5B placed in front of them. Furthermore, at these windows, there are placed U-shaped rails 8A, 8B on which eyesight-correcting lenses 9A, 9B can be placed.

The support 2 presents two lateral orifices 10A, 10B that enable the light guides 5A, 5B to be adjusted to the pupillary distance of the wearer by an adjustment arrangement that is described in greater detail below.

In the description below with reference to FIGS. 3 to 7, it is deliberate that no mention is made of electronic elements that are integrated in the device, which elements are not shown in the figures in question, these figures relating only to the mechanical and optical component parts.

Figure 3:
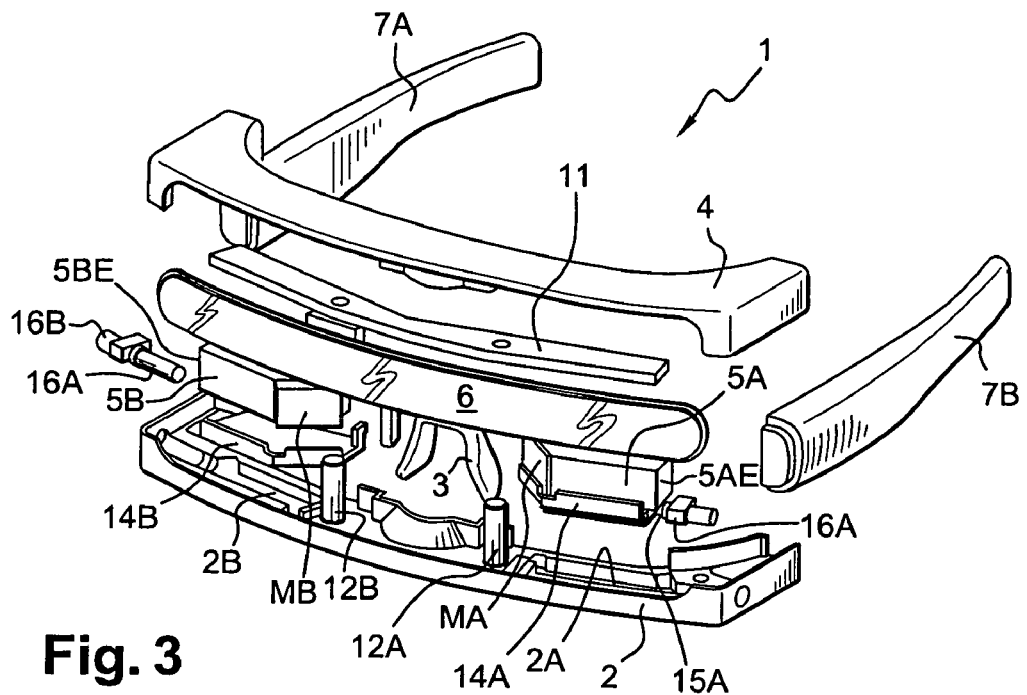
FIG. 3 is an exploded perspective view of a binocular display device in accordance with the invention, seen from in front.
Figure 4:
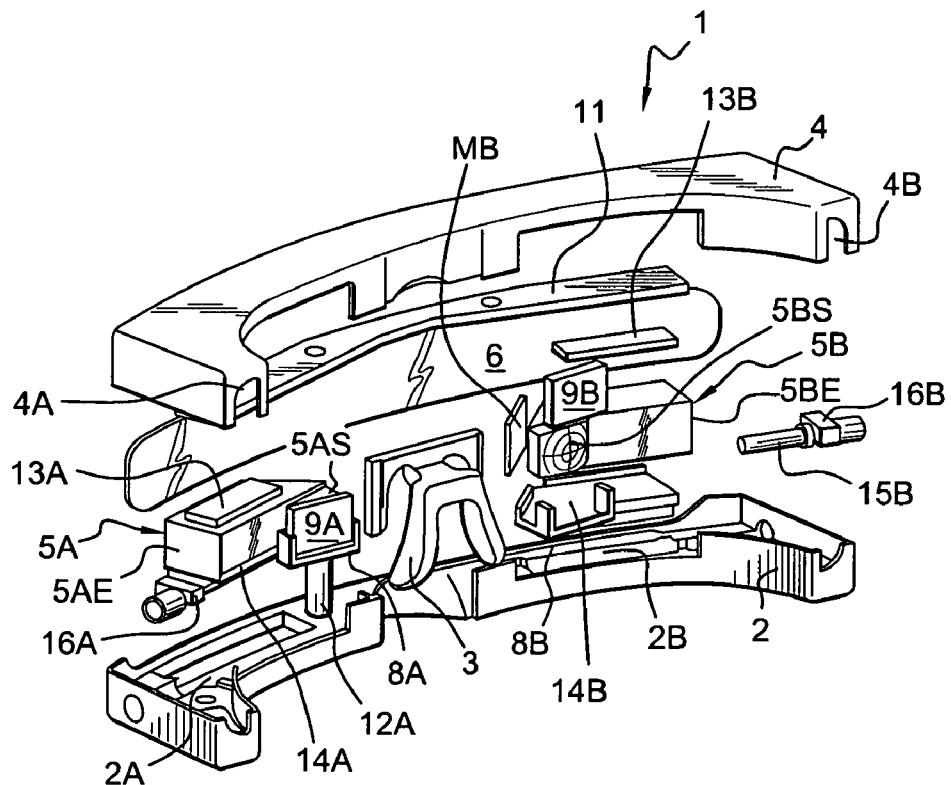
FIG. 4 is an exploded perspective view of a binocular display device according to the invention, seen from behind.

As can be seen more clearly in FIGS. 3 and 4, the branches being omitted for FIG. 4, the binocular device 1 thus comprises the support 2, which itself supports a right display element and a left display element, each intended to be placed in front of an eye of the wearer and each including a light guide 5A, 5B for receiving a beam of light rays emitted by a beam generator device (not shown) towards an inlet face 5AE, 5BE and for propagating the beam to an outlet face 5AS, 5BS where the beam is directed towards the corresponding eye.

The binocular device 1 includes an arrangement for adjusting the pupillary distance, which arrangement serves to move at least one of the light guides 5A, 5B relative to the support 2 so as to adjust the distance between the light guides.

The light guides 5A, 5B are placed over the support 2 and they are held by a strip 11 placed over the light guides and secured to the support 2 by means of at least one spacer, more specifically by two spacers 12A, 12B, with at least one piece of slack takeup means being interposed between the strip 11 and the light guides 5A, 5B.

Preferably, the slack takeup means are constituted by a resilient element or compliance element, in this example a resilient pad 13A, 13B interposed between the strip 11 and each of the light guides 5A, 5B. This resilient element may be a pad of expanded plastics material of the foam type.

The pupillary distance adjustment arrangement is constituted by a rail and slideway arrangement carried respectively by the support 2 and by the respective light guides 5A, 5B. The slideway is constituted by a plate 14A, 14B of T-shaped cross-section and secured to the corresponding light guide, advantageously by adhesive. The rail is shaped in the support 2 by a groove 2A, 2B in which a portion of the section of the slideway plate that corresponding to the foot of the T-shaped is engaged.

The slideway plate 14A, 14B also includes the U-shaped rail 8A, 8B that forms a device for supporting the eyesight-correcting lens.

The pupillary distance adjustment device can be actuated manually or it can be motor driven. It enables a single and symmetrical adjustment to be performed or it enables two independent adjustments to be performed, each adjustment serving to adjust a pupillary half-distance.

In the example shown, it can be actuated manually from the outside with the help of the two lateral orifices 10A, 10B. Each slideway plate 14A, 14B is connected to a screw and nut device 15A & 16A, 15B & 16B, that can be actuated through the corresponding lateral orifice arranged in the support 2.

Assembling of the various component parts together is particularly simple. All of the parts are sandwiched between the support 2 and the cover part 4, as shown in FIGS. 5 and 6, where the cover part has not yet been put into place.

Each slideway plate 14A, 14B is secured to the corresponding light guide 5A, 5B and then the resulting assembly is placed in the corresponding rail 2A, 2B of the support 2. The two spacers 12A, 12B are put into place and receive the strip 11, after the pads 13A, 13B have been interposed. By means of screws passing longitudinally through the spacers (not shown), the strip 11 is fastened to the support 2, with the pads being compressed and with the light guides 5A, 5B being secured. The screw-and-nut arrangements are put into place, the nuts 16A, 16B being housed in corresponding grooves molded in the support 2. The pince-nez type element 3 carried by a baseplate 3A is put into place by sliding the baseplate in grooves likewise molded in the support 2. The branches 7A, 7B can then be engaged via their connection ends in slots 2C, 2D arranged in the support 2. The cover part 4 can finally be mounted on the assembly, said part also having slots 4A, 4B that clamp onto the connection ends of the branches 7A, 7B.

Figure 5:
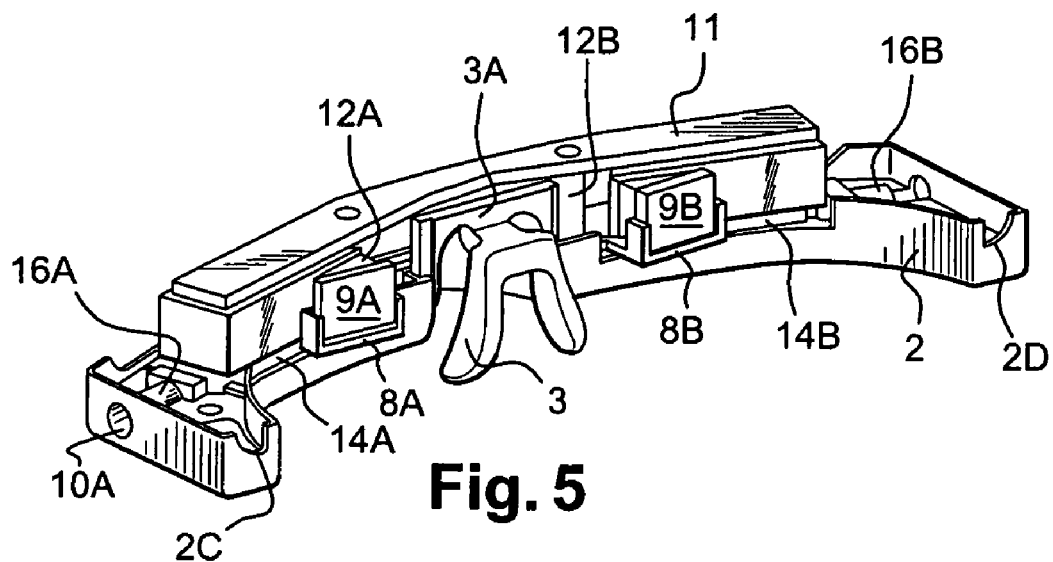
FIG. 5 is a fragmentary perspective view of a binocular display device in accordance with the invention, seen from behind.
Figure 6:
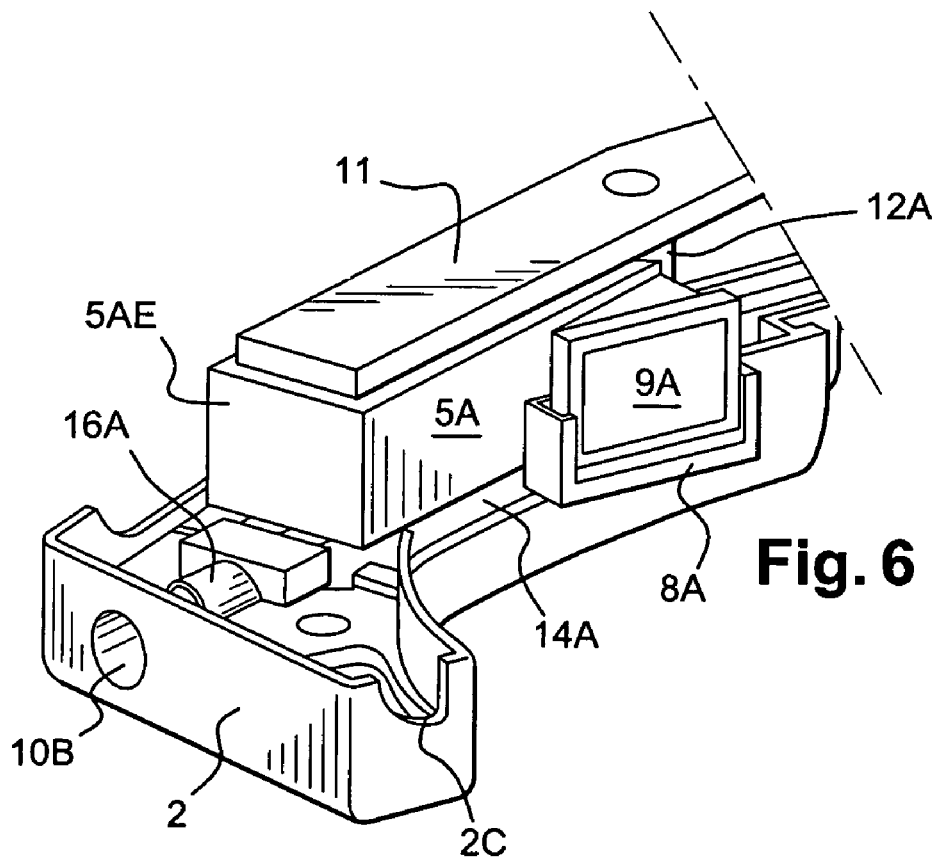
FIG. 6 is a perspective view showing a detail of a binocular display device in accordance with the invention, seen from behind.

In FIGS. 5 and 6, eyesight-correcting lenses 9A, 9B are also visible, which lenses are placed, when desired by the wearer, in the U-shaped rails 8A, 8B.

FIG. 7 shows a slideway plate 14A and its associated adjustment arrangement in greater detail.

The base 14AB of the plate presents a T-shaped section forming a slideway as described above. On its top face, this base has at least two ribs 14AN1, 14AN2 for positioning the light guides. Finally, it includes an extension extending perpendicularly to the outlet face of the light guide that is to be supported and carrying the correcting lens support in the form of the U-shaped rail 8A.

The adjustment screw 15A is secured laterally to the base 14AB of the slideway plate and passes through a nut 16A that is designed to be prevented from rotating in the support 2 of the binocular device. By using a tool having a hexagonal tip that passed through the orifice 10A of the support, the screw 15A can be turned to move the slideway plate 14A therewith in the rail 2A of the support 2 of the binocular device.

Various types of light guide can be used to constitute the binocular device in accordance with the invention.

In the example shown, the device is an imager of the same type as those described in U.S. Pat. No. 6,204,974. Such an optical imager serves to shape the light beams coming from an electronic and optical system for generating light beams from an electronic signal, of the miniature screen, laser diode, or light-emitting diode type. The optical imager directs the light beams towards the wearer's eye in order to enable its information content to be viewed.

The imager is constituted by a prism carrying the inlet surfaces 5AE, 5BE for the light rays and a combiner directing the light beams towards the eye of the wearer, and carrying the outlet surfaces 5AS, 5BS for the light rays. At the interfaces between the prisms and the combiners there are placed respective mirrors MA, MB that reflect the light rays towards the eyes.

FIG. 8 is a fragmentary perspective view of a variant of the binocular display device of the invention shown fitted with its electronics.

This variant differs from the above-described embodiment in the design of the strip 11' that is fastened to the support 2 by four spacers 12A, 12B, 12C, 12D, comprising two center spacers 12A, 12B and two end spacers 12C, 12D.

In general, whatever the variant embodiment, and as also shown in FIG. 8, a miniature screen E1, E2 is placed facing the inlet face of each light guide 5A, 5B.

One of the two screens, e.g. E1, is connected to a cable (not shown) that transmits an electronic signal thereto conveying information from an information source. The cable is advantageously housed in the corresponding branch 7A.

A conductor in strip form connects the screen E1 to the second screen E2, and serves to transmit said information to the other screen. Thus, both screens display the same pixelized image corresponding to the information. This connector C is advantageously placed on the strip 11 or 11', with the arrangement subsequently being closed by the cover part 4.

What is claimed is:

1. A binocular device for displaying information, the device comprising:
   a support for placing on the nose and supporting a right display element and a left display element each designed to be placed in front of an eye and each comprising a light guide for receiving a beam of light rays emitted by a beam generator device towards an inlet face and for propagating the beam to an outlet face where the beam is directed towards the corresponding eye, the binocular device having an arrangement for adjusting the pupillary distance by moving at least one of the light guides relative to said support so as to adjust the distance between the light guides, wherein said light guides are disposed on and carried by slideways, said slideways having a bottom surface contoured to fit into a corresponding groove within said support forming a housing of the binocular device when associated with a separate higher cover part, said light guides being held by a strip disposed over the light guides and secured to said support by means of at least one spacer the higher cover part being connected to said support and enclosing the light guides and said strip, at least one slack takeup element formed as a resilient pad being interposed between said strip and said light guides to keep said light guides on said slideways in secure compliance with said groove in said support.

2. A binocular device according to claim 1, including, facing said outlet faces of said light guides, respective devices for supporting eyesight-correcting lenses.

3. A binocular device according to claim 1, wherein said slideways further comprise a plate of T-shaped cross-section and secured to said light guide.

4. A device according to claim 3, wherein said adjustment arrangement presents a device that can be actuated from the outside, manually or under motor drive, and wherein said actuatable device includes a screw-and-nut device connected to said plate and capable of being actuated through a lateral orifice arranged in said support.

5. A binocular device according to claim 1, wherein said adjustment arrangement presents a device that can be actuated from the outside, manually or under motor drive.

* * * * *